United States Patent
Blizzard et al.

[11] Patent Number: 5,739,192
[45] Date of Patent: Apr. 14, 1998

[54] POLYSILOXANE COPOLYMERS FROM MICHAEL ADDUCT REACTIONS

[75] Inventors: John D. Blizzard, Bay City; Vicky Sue Cobb, Elsie, both of Mich.

[73] Assignee: Dow Corning Corporation, Midland, Mich.

[21] Appl. No.: 753,132

[22] Filed: Nov. 20, 1996

[51] Int. Cl.$^6$ .................................................. C08K 5/05
[52] U.S. Cl. .......................... 524/379; 524/588; 528/26; 528/33; 528/38
[58] Field of Search ............................ 528/26, 38, 33; 524/588, 379

[56] References Cited

U.S. PATENT DOCUMENTS 4,698,406 10/1987 Lo et al. ................................. 525/477

OTHER PUBLICATIONS

Encyclopedia of Polymer Science and Engineering, vol. 15, pp. 204–205, John Wiley & Sons, NY, 1989.

*Primary Examiner*—Melvyn I. Marquis
*Attorney, Agent, or Firm*—Richard I. Gearhart

[57] ABSTRACT

The invention is a composition formed by the reaction product of (A) at least one polysiloxane selected from the group consisting of
(i) $R_3SiO(SiR_2O)_xSiR_3$ and (ii)

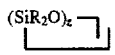

where:
has an average value of from 0 to 1000.
z has a value of at least 3.

R is independently selected from the group consisting of a hydroxyl group, alkoxy group, tri-fluoropropyl group, an alkyl chain of 1 to 4 carbon atoms, a phenyl group, and an amine functional group, with the proviso that at least one R on the polysiloxane is an amine functional group; and
(B) at least one acrylate having the formula

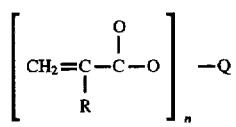

where R is H or $CH_3$, $n \geq 1$ and Q is an organic group.

19 Claims, No Drawings

POLYSILOXANE COPOLYMERS FROM MICHAEL ADDUCT REACTIONS

FIELD OF THE INVENTION

The invention relates to novel polysiloxane copolymers produced by a Michael Addition reaction between polysiloxanes containing amine functional groups and acrylates having hydrocarbon containing groups.

SUMMARY OF THE INVENTION

Although the use of Michael Addition chemistry is well known in the art, its use in silicone chemistry has been limited. A novel method of making functional or non-functional siloxanes has been found using this Michael Adduct chemistry by reacting aminofunctional siloxanes with acrylate functional moieties to produce functional or non-functional siloxanes. In contrast to vinyl-SiH addition reactions, this reaction requires no additional catalyst, and the final stoichiometry of the copolymer can be easily controlled by the amine and acrylate molar ratios. Thus, the siloxane copolymers can be made without platinum catalysts and are often clear upon completion of adduct formation.

The present invention is a composition formed by the reaction product of (A) and (B) where A) is at least one polysiloxane selected from the ,group consisting of (i) $R_3SiO(SiR_2O)_xSiR_3$ and (ii)

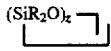

where:

x has an average value of from 0 to 1000, has a value of at least 3,

R is independently selected from the group consisting of a hydroxyl group, alkoxy group, tri-fluoropropyl group, an alkyl chain of 1 to 4 carbon atoms, a phenyl group, and an amine functional group, with the proviso that at least one R on the polysiloxane is an amine functional group;

B) is at least one acrylate having the formula

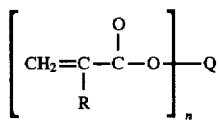

where R is H or $CH_3$, $n \geq 1$, and Q is an organic group, wherein said reaction between A and B optionally takes place in a solvent.

In particular, the invention relates to novel silicone containing copolymers such as silicone-glycol polymers, silicone-alkyl polymers, and silicone-aromatic polymers. These novel polymers are prepared via a Michael Addition reaction, using polysiloxanes having amine functionality with an acrylate having an organic containing group such as a polyether, alkyl or aromatic group.

DETAILED DESCRIPTION OF THE INVENTION

The siloxane polymers of the present invention have the following formula $R_3SiO(SiR_2O)_xSiR_3$ and (ii)

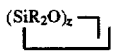

where:

x has an average value of from 0 to 1000, z has a value of at least 3,

R is independently selected from the group consisting of a hydroxyl group, alkoxy group, tri-fluoropropyl group, an alkyl chain of 1 to 4 carbon atoms, a phenyl group, and an amine functional group, with the proviso that at least one R on the polysiloxane is an amine functional group.

These linear or cyclic polymers can be waxes or liquids having viscosities ranging from 5 to 50,000 cs., and molecular weights of about 300 to 25,000. While x can be any value from 0 to 1000, a preferred range can be from 0 to 500, where x is most preferably 0 to 100. z can be any number greater than or equal to 3.

For the purposes of the present invention, the above mentioned amine functional group is connected to at least one silicon atom of polysiloxane (A) through a silicon-carbon bond and preferably has the general formula

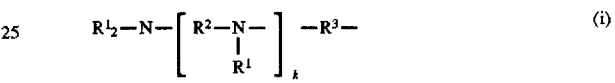

In the above formula, $R^1$ is a monovalent radical independently selected from the group consisting of hydrogen; alkyl having 1 to 18 carbon atoms, such as methyl, ethyl, propyl, isobutyl, hexyl, octyl, decyl, dodecyl and octadecyl; substituted alkyl having 1 to 18 carbon atoms, such as 3-chloropropyl and 3,3,3-trifluoropropyl; aryl having 6 to 16 carbon atoms, such as phenyl and naphthyl; substituted aryl having 6 to 30 carbon atoms, such as chlorophenyl, chlorotolyl and dichloroxylyl; arylalkyl having 7 to 9 carbon atoms, such as benzyl, phenethyl and 3-phenylpropyl; and alkylayl having 7 to 16 carbon atoms such as tolyl, xylyl, ethylphenyl and propyltolyl. According to the instant invention, at least one $R^1$ group in formula (i) is hydrogen. The remaining $R^1$ groups are preferably methyl. In formula (i), $R^2$ is a divalent hydrocarbon radical having 2 to 6 carbon atom, such as ethylene, trimethylene, tetramethylene and hexamethylene, preferably ethylene, and k is 0, 1 or 2. $R^3$ is a divalent organic connecting group which provides a separation of at least one carbon atom between the nitrogen of formula (i) and silicon on polysiloxane (A). Thus, this group contains at least 1 carbon atom, but its nature is otherwise not critical to the invention provided that it is chemically stable with respect to the hydrolyzable alkoxy group (i.e., does not react therewith) and it does non interfere with the reaction of the acrylic functionality of component (B) with the amine functionality of component (A). Preferably, $R^3$ is selected from the group consisting of propylene, butylene and isobutylene.

Examples of specific amine-containing groups include such structures as —$CH_2CH_2CH_2NH_2$, —$CH_2CH_2CH_2N(H)CH_2CH_2NH_2$ , —$CH_2CH_2CH_2N(H)CH_2CH_2N(H)CH_2CH_2NH_2$, —$CH_2CH_2CH_2CH_2NH_2$, —$CH_2CH_2CH_2CH_2CH_2NH_2$, —$CH_2CH_2CH_2N(H)Me$, —$CH_2CH_2CH_2N(H)CH_2CH_2NMe_2$, —$CH_2CH_2CH_2N(H)Et$, —$CH_2CH(CH_3)CH_2N(H)CH_2CH_2NH_2$ and —$CH_2CH(CH_3)CH_2NH_2$, inter alia, wherein Me and Et hereinafter denote methyl and ethyl, respectively.

The above described polysiloxanes (A) can be prepared by methods known in the art. For example, they may be obtained by reacting a mixture of an alkoxysilane such as methyltrimethoxy-silane, tetraethoxysilane, tetramethoxysilane, dimethyldimethoxy-silane or phenyltrimethoxysilane, and an amine-functional alkoxysilane to obtain a polyorganosiloxane having a statistical distribution of amine groups and alkoxy groups on different silicon atoms. This scheme may be practiced sequentially or simultaneously to alter the distribution of amine and alkoxy moieties. Additionally, different structures may be prepared by equilibrating the above polymers with additional organosiloxane units using a siloxane redistribution catalyst, such as an alkali metal hydroxide or silanolate. Such equilibration procedures may also be employed to obtain a statistical distribution of alkoxy, alkyl and amine groups by reacting a mixture of cyclic diorganopolysiloxane, an aminoalkylalkoxysilane and, optionally, an alkoxysilane.

The polysiloxane (A) of the invention described above is combined with at least one acrylate having the formula

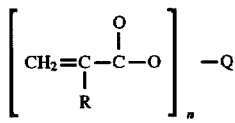

where R is H or $CH_3$, $n \geq 1$, and Q is an organic group.

The acrylate (B) can be either monofunctional, as in the case where n is equal to 1, or multifunctional, where R is greater than 1. In the case where $n \geq 1$, n is preferably in the range from 2 to 5, with the values 2, 3 or 4 being most preferred. Specific examples of acrylates useful in the practice of the present invention are polyethylene glycol monoacrylate, polypropylene glycol monoacrylate, tetrafluoropropyl acrylate, methoxypoly (ethyleneoxy) ethyl acrylate, 1,6 hexanediol diacrylate, 1,4-butanediol diacrylate, ethylene glycol diacrylate, diethylene glycol diacrylate, tetraethylene glycol diacrylate, triproplyene glycol diacrylate, neopennyl glycol diacrylate, 1,4-butanediol dimethacrylate, poly (butanediol) diacrylate, tetraethyleneglycoldimethacrylate, 1,3 -butylene glycol diacrylate, triethylene glycol diacrylate, polyethylene glycol diacrylate, and bisphenol A dimethacrylate, trimethylolpropane triacrylate, trimethylolpropane trimethacrylate, pentaerythritolmonohydroxy triacrylate, di-trimethylolpropane tetraacrylate, and dipentaerythritol (monohydroxy) pentaacrylate, diethyleneglycol diacrylate, tetraethyleneglycol diacrylate, and polyethylenegylcol diacrylate.

It is expected that Q can be any organic group which does not interfere with the Michael Addition reaction between the reactive amine of the polysiloxane (A) and the acrylate component (B).

Typical groups Q include polyethers, and aliphatic, aromatic, and alicyclic groups. The Q groups can be functional and reactive, or non-functional or non-reactive.

For example, Q can be any monovalent hydrocarbon radical such as alkyl radicals having from 1 to 100 carbon atoms, including methyl, ethyl, propyl, isopropyl, butyl, pentyl, isopentyl, neopentyl, hexyl, octyl, dodecyl, octadecyl, 3 -methylheptyl, 6 butyloctadecyl, tertiary butyl, myricyl and 2,2 -diethylpentyl; alkenyl radicals such as vinyl, allyl, hexenyl, butenyl, 3 octenyl, 4,9 -octadecadienyl and 4 -nonenyl; alkynyl radicals such as propynyl, heptynyl, butynyl, decynyl; alkenynyl radicals such as 1-penten-3-ynyl, 2-ethyl-1-buten-3-ynyl; cycloaliphatic radicals such as, cyclohexyl, 2,4-dimethylcyclopentyl, cyclohexenyl, bicyclo[3.1.0]hexyl, tricyclo[3.2.1.1.$^{3,8}$]-5-nonenyl, spiro [4.5]decyl, dispiro[4.1.4.2]-1-tridecenyl, decahydronaphthyl, 2,3-dihydroindyl and 1,2,3,-tetrahydronaphthyl; aryl radicals such as phenyl, tolyl, xylyl, 3-ethylphenyl, xenyl, naphthyl, anthracyl, pentacenyl, 3,4-methylethylphenyl, 9,9'-bifluoryl and 4-m-terphenyl; and aralkyl radicals such as 2-phenyl-octyl, 3-methyl-2-(4-isopropylphenyl)heptyl, benzyl, 2-ethyltolyl, 2-ethyl-p-cymyl, diphenylmethyl, 4,5-diphenylpentyl, 2-phenylethyl and 2-phenylpropyl.

In addition Q can be the same or different radical or radicals containing oxyethylene groups, oxypropylene groups, oxybutylene groups, or any combination of oxyethylene groups, oxypropylene groups, or oxybutylene groups. A representative Q is a polyether selected from the group consisting of:

(i) —$(CH_2)_y(OCH_2CH_2)_a(OCH_2CHCH_3)_b[OCH_2CH(CH_2CH_3)]_cOR'$, (ii) —$(CH_2)_y(OCH_2CH_2)_aOR'$, (iii) —$(CH_2)_y(OCH_2CH_2)_a(OCH_2CHCH_3)_bOR'$, (iv) —$(CH_2)_y[OCH_2CH(CH_2CH_3)]_cOR'$, (v) —$(CH_2)_y(OCH_2CHCH_3)_b[OCH_2CH(CH_2CH_3)]_cOR'$, (vi) —$(CH_2)_y(OCH_2CH_2)_a[OCH_2CH(CH_2CH_3)]_cOR'$, and (vii) —$(CH_2)_y(OCH_2CHCH_3)_bOR'$, where R' can be hydrogen, an alkyl radical having from 1 to 4 carbon atoms an aryl radical having 6 to 12 carbon atoms, an aralkyl radical having at least 6 carbon atoms; or an acyl radical and the integer y is 2–20; a is 1–120; b is 1–50; and c is 1–50.

Typical polyethers include —$(CH_2CH_2O)_8H$, —$(CH_2CH_2O)_{12}H$, —$(CH_2CH_2O)_8CH_3$, —$(CH_2CH_2O)12CH_3$, —$(CH_2CH_2O)_8C(O)CH_3$, —$(CH_2CH_2O)_{20}H$, —$(CH_2CH(CH_2CH_3)O)_{10}CH_3$, and —$(CH_2CHCH_3O)_5C(O)CH_3$ or blends of the above. The molar ratio of NH to acrylate can be varied from 1000 to 0.001. Ratios of 1 or less are preferred for the preparation of flowable fluids or waxes. Above a ratio of 1, gels can be formed.

Most of the copolymers described herein can be produced without the aid of a solvent. However, when a solvent is used the solvent is best selected based on solubility of the final product. Typical solvents are aliphatic, aromatic, alcohols and water.

The composition can also include fillers, both reinforcing fillers and extending fillers as conventionally used. The fillers can be present in an amount of up to 200 parts by weight of copolymer. Typical fillers include silica, aluminum oxide, hydrated aluminum hydroxide, diatomaceous earths, magnesium hydroxide, ground quartz, mica, calcium carbonate, clay, barium sulfate, zinc oxide, iron oxide, and talcum. Various pigments, such as carbon black or titanium dioxide, may also be added as fillers, as can common fumed and precipitated silicas, and colloidal silicas Precipitated surface treated calcium carbonates can be used as semi-reinforcing fillers, and ground calcium carbonates, either treated or untreated, can be used as extending fillers.

The compositions of the oresent invention are useful as profoam agents, anticaking agents, water repellents, antifouling agents, antifoam agents, surfactants, fiber treatment agents, protective coatings and slid aids.

EXAMPLES

In the following examples the term "polyethylene glycol 400 monoacrylate" represents an acrylated polyether having the structure $CH_2$=$CHC(O)O(C_2H_4O)_8H$ (Mw=512.6), the term "polypropylene glycol 400 monoacrylate" represents an acrylated polyether having the structure $CH_2$=$CHC(O)O(C_3H_6O)_5H$ (Mw=362.5), the term "polyethylene glycol 540 monoacrylate" represents an acrylated polyether having the structure $CH_2$=$CHC(O)O(C_2H_4O)_{11}CH_3$ (Mw=541), the term "polyethylene glycol 1000 monoacrylane" represents an acrylated polyether having the structure $CH_2=CHC(O)O(C_2H_4O)_{20}H$ (Mw=952), and the term "polyethylene glycol 2000 monoacrylate" represents an acrylated polyether having the structure $CH_2=CHC(O)O(C_2H_4O)_{43}H$ (Mw=1964).

The viscosities were measured at 23° C. using a Brookfield Digital Viscometer, Model DC-II using spindle #3 at 60 rpm, available from Brookfield Engineering Laboratories, Stoughton, Mass.

Example 1

M'D$_{193}$M'+PEG 400

$(NH_2CH_2CH_2CH_2)Me_2SiO(SiMe_2O)_{193}SiMe_2(CH_2CH_2CH_2NH_2)$ (19.43 g, 1.33 mmoles) and polyethylene glycol 400 monoacrylate (0.57 g, 1.33 mmoles) were weighed into a 10 dram vial. The solution was stirred with a magnetic stirrer and stir bar for one hour. The final material was a cloudy, white liquid, with viscosity=1660 cp.

Example 2

MD$_3$D"$_1$M+PEG 400

$Me_3SiO(SiMe_2O)_3\{(NH_2CH_2CH_2NHCH_2CH(CH_3)CH_2)MeSiO\}_1SiMe_3$ (10.16 g, 10.0 mmoles) and polyethylene glycol 400 monoacrylate (10.25 g, 20.0 mmoles) were weighed into a 10 dram vial. The solution was stirred with a magnetic stirrer and stir bar for one hour. The final material was a clear, yellow liquid with viscosity=925 cp.

Example 3

MD$_{100}$D"$_3$M+PEG 400

$Me_3SiO(SiMe_2O)_{100}\{(NH_2CH_2CH_2NHCH_2CH(CH_3)CH_2)MeSiO\}_3SiMe_3$ (17.12 g, 2.12 mmoles) and polyethylene glycol 400 monoacrylate (3.08 g, 6.01 mmoles) were weighed into a 10 dram vial. The solution was stirred with a magnetic stirrer and stir bar for one hour. The final material was a gel.

Example 4

MD$_{10}$D"$_2$M+PPG 400

$Me_3SiO(SiMe_2O)_{10}\{(NH_2CH_2CH_2NHCH_2CH(CH_3)CH_2)MeSiO\}_2SiMe_3$ (8.55 g, 5.00 mmoles) and polypropylene glycol 400 monoacrylate (7.25 g, 20.0 mmoles) were weighed into a 10 dram vial. The solution was stirred with a magnetic stirrer and stir bar for one hour. The final material was a clear liquid with viscosity=752 cp.

Example 5

MD$_3$M"$_1$M+PEG 2000

$Me_3SiO(SiMe_2O)_3\{(NH_2CH_2CH_2NHCH_2CH(CH_3)CH_2)MeSiO\}_1SiMe_3$ (10.16 g, 10.0 mmoles) and polyethylene glycol 2000 monoacrylate (26.97 g, 10.0 mmoles) were weighed into a 10 dram vial. The solution was stirred with a magnetic stirrer and stir bar for one hour. The final material was a wax at room temperature.

Example 6

MD$_{100}$D'M+PPG 400

$Me_3SiO(SiMe_2O)_{100}\{(NH_2CH_2CH_2CH_2)MeSiO\}_1SiMe_3$ (17.12 g, 2.23 mmoles) and polypropylene glycol 400 monoacrylate (2.18 g, 6.14 mmoles) were weighed into a 10 dram vial. The solution was stirred with a magnetic stirrer and stir bar for one hour. The final material was a cloudy liquid with viscosity=6810 cp.

Example 7

M'D$_{10}$M'+PPG 400+PEG 400

$(NH_2CH_2CH_2NHCH_2CH(CH_3)CH_2)Me_2SiO(SiMe_2O)_{10}SiMe_2(CH_2CH_2CH_2NHCH_2CH_2NH_2)$ (6.76 g, 6.49 mmoles) and polypropylene glycol 400 monoacrylate (2.34 g, 6.46 mmoles) and polyethylene glycol 400 monoacrylate (3.31 g, 6.46 mmoles) were weighed into a 10 dram vial. The solution was stirred with a magnetic stirrer and stir bar for one hour. The final material was a clear liquid with viscosity of 1660 cps.

Example 8

MD$_{100}$'M+PPG 400+PEG 400

$Me_3SiO(SiMe_2O)_{100}\{(NH_2CH_2CH_2CH_2)MeSiO\}_1SiMe_3$ (5.00 g, 0.645 mmoles), polypropylene glycol 400 monoacrylate (2.16 g, 5.97 mmoles) and polyethylene glycol 400 monoacrylate (3.06 g, 5.98 mmoles) were weighed into a 10 dram vial. The solution was stirred with a magnetic stirrer and stir bar for one hour. The final material was a clear liquid with viscosity=1580 cp.

Example 9

D"$_4$+PPG 400

$(OSiMeCH_2CHMeCH_2NH(CH_2)_2NH_2)_4$ (6.96 g, 10 mmoles) and polypropylene glycol 400 monoacrylate (3.62 g 10 mmoles) were added to a 10 dram vial. The solution was stirred with a magnetic stirrer and stir bar for one hour. The final material was a clear fluid with viscosity=7530 cp.

Example 10

EO NONYLPHENOL ACRYLATE $(NH_2CH_2CH_2NHCH_2CH(CH_3)CH_2)Me_2SiO(SiMe_2O)_{10}SiMe_2(CH_2CH_2CH_2NHCH_2CH_2NH_2)$ (10.4 g, 10 mmoles) and ethoxylated nonylphenol acrylate $(CH_2=CHC(O)OC_9H_{19}C_6H_4OC_2H_5)$ (4.5 g, 10.0 mmoles) were weighed into a 10 dram vial. The solution was stirred with a magnetic stirrer and stir bar for one hour. The final material was a clear fluid, with a viscosity of 1160 cp.

$(NH_2CH_2CH_2NHCH_2CH(CH_3)CH_2)Me_2SiO(SiMe_2O)_{10}SiMe_2(CH_2CH_2CH_2NHCH_2CH_2NH_2)$ (7 g, 6.72 mmoles) and ethoxylated nonylphenol acrylate $(CH_2=CHC(O)OC_9H_{19}C_6H_4OC_2H_5)$ (6.6 g, 14.67 mmoles) were weighed into a 10 dram vial. The solution was stirred with a magnetic stirrer and stir bar for one hour. The final material was a clear fluid, with a viscosity of 1240 cp.

Example 11

TRIDECYLACRYLATE $(NH_2CH_2CH_2NHCH_2CH(CH_3)CH_2)Me_2SiO(SiMe_2O)_{10}SiMe_2(CH_2CH_2CH_2NHCH_2CH_2NH_2)$ (10.49 g, 0.07 mmoles) and tridecylacrylate $(CH_2=CHC(O)O(CH_2)_{12}CH_3)$ (2.5 g 9.84 mmoles) were weighed into a 10 dram vial. The solution was stirred with a magnetic stirrer and stir bar for one hour. The final material was a clear fluid, with a viscosity of 220 cp.

$(NH_2CH_2CH_2NHCH_2CH(CH_3)CH_2)Me_2SiO(SiMe_2O)_{10}SiMe_2(CH_2CH_2CH_2NHCH_2CH_2NH_2)$ (10.49 g, 10.07 mmoles) and tridecylacrylate, $(CH_2=CHC(O)O(CH_2)_{12}CH_3)$ (5.00 g, 19.7 mmoles) were weighed into a 10 dram vial. The solution was stirred with a magnetic stirrer and stir bar for one hour. The final material was a clear fluid, with a viscosity of 200 cp.

Example 12

CAPROLACTONE ACRYLATE $(NH_2CH_2CH_2NHCH_2CH(CH_3)CH_2)Me_2SiO(SiMe_2O)_{10}SiMe_2$ $(CH_2CH_2CH_2NHCH_2CH_2NH_2)$ (8.00 g, 7.68 mmoles) and caprolactone acrylate $(CH_2=CHC(O)O(CH_2)_2 (OC(O) (CH_2)_5O)_2H$ (5.23 g, 15.2 mmoles) were weighed into a 10 dram vial. The solution was stirred with a magnetic stirrer and stir bar for one hour. The final material was a clear fluid, with a viscosity of 200 cp.

Example 13

LAURYL ACRYLATE $(NH_2CH_2CH_2NHCH_2CH(CH_3)CH_2)Me_2SiO(SiMe_2O)_{10}SiMe_2$ $(CH_2CH_2CH_2NHCH_2CH_2NH_2)$ (8.00 g, 7.68 mmoles) and lauryl acrylate $(CH_2=CHC(O)O(CH_2)_{11}CH_3)$ (1.85 g, 7.70 mmoles) were weighed into a 10 dram vial The solution was stirred with a magnetic stirrer and stir bar for one hour. The final material was a clear fluid, with a viscosity of 190 cp.

$(NH_2CH_2CH_2NHCH_2CH(CH_3)CH_2)Me_2SiO(SiMe_2O)_{10}SiMe_2$ $(CH_2CH_2CH_2NHCH_2CH_2NH_2)$ (7.00 g, 6.72 mmoles) and lauryl acrylate (3.23 g, 13.45 mmoles) were weighed into a 10 dram vial. The solution was stirred with a magnetic stirrer and stir bar for one hour. The final material was a clear fluid, with a viscosity of 150 cp.

$(NH_2CH_2CH_2NHCH_2CH(CH_3)CH_2)Me_2SiO(SiMe_2O)_{10}SiMe_2$ $(CH_2CH_2CH_2NHCH_2CH_2NH_2)$ (7.00 g, 6.72 mmoles) and lauryl acrylate (6.46 g, 26.92 mmoles) were weighed into a 10 dram vial. The solution was stirred with a magnetic stirrer and stir bar for one hour. The final material was a clear fluid, with a viscosity of 60 cp.

$(NH_2CH_2CH_2NHCH_2CH(CH_3)CH_2)Me_2SiO(SiMe_2O)_{10}SiMe_2$ $(CH_2CH_2CH_2NHCH_2CH_2NH_2)$ (6 g, 5.76 mmoles) and lauryl acrylate (8.31 g, 34.63 mmoles) were weighed into a 10 dram vial. The solution was stirred with a magnetic stirrer and stir bar for one hour. The final material was a clear fluid, with a viscosity of 210 cp.

Example 14

$MD_3D"M+PEG\ 400$ $Me_3SiO(SiMe_2O)_3\{(NH_2CH_2CH_2NHCH_2CH(CH_3)CH_2)MeSiO\}_1SiMe_3$ (5.60 g, 5.51 mmoles) and (polyethylene glycol 400 monoacrylate) (5.40 g, 10.54 mmoles) were weighed into a 10 dram vial. The solution was stirred with a magnetic stirrer and stir bar for one hour. The final material was a clear, yellow liquid with viscosity of 760 cp.

Examples 15

$MD_{10}D"_2M$ $Me_3SiO(SiMe_2O)_{10}\{(NH_2CH_2CH_2NHCH_2CH(CH_3)CH_2)MeSiO\}_2SiMe_3$ (9.00 g, 7.19 mmoles) and polyethylene glycol 400 monoacrylate (3.89 g, 7.9 mmoles) were weighed into a 10 dram vial. The solution was stirred with a magnetic stirrer and stir bar for one hour. The final material was a clear liquid with viscosity of 381 cp.

$Me_3SiO(SiMe_2O)_{10}\{(NH_2CH_2CH_2NHCH_2CH(CH_3)CH_2)MeSiO\}_2SiMe_3$ (6.94 g, 5.54 mmoles) and polyethylene glycol 400 monoacrylate (6.00 g, 11.09 mmoles) were weighed into a 10 dram vial. The solution was stirred with a magnetic stirrer and stir bar for one hour. The final material was a hazy liquid with viscosity of 651 cp.

$Me_3SiO(SiMe_2O)_{10}\{(NH_2CH_2CH_2NHCH_2CH(CH_3)CH_2)MeSiO\}_2SiMe_3$ (4.15 g, 3.31 mmoles) and polyethylene glycol 400 monoacrylate (8.00 g, 15.62 mmoles) were weighed into a 10 dram vial. The solution was stirred with a magnetic stirrer and stir bar for one hour. The final material was a clear liquid with viscosity of 551 cp.

Example 16

$M"D\ M"_{10}+PEG\ 400$ $(NH_2CH_2CH_2NHCH_2CH(CH_3)CH_2)Me_2SiO(SiMe_2O)_{10}SiMe_2$ $(CH_2CH_2CH_2NHCH_2CH_2NH_2)$ (5.78 g, 5.55 mmoles) and polypropylene glycol 400 monoacrylate (6.00 g, 16.57 mmoles) were weighed into a 10 dram vial. The solution was stirred with a magnetic stirrer and stir bar for one hour. The final material was a clear liquid, and had a viscosity of 1310 cp.

Example 17

$MD_{100}D"M+PEG\ 400$ $Me_3SiO(SiMe_2O)_{100}\{(NH_2CH_2CH_2NHCH_2CH(CH_3)CH_2)MeSiO\}_1SiMe_3$ (14.35 g, 1.85 mmoles) and polyethylene glycol 400 monoacrylate (1.00 g, 1.85 mmoles) were weighed into a 10 dram vial. The solution was stirred with a magnetic stirrer and stir bar for one hour. The final material was a hazy liquid, with a viscosity of 190 cp.

Example 18

$MD_{100}D"M+PEG2000$ $Me_3SiO(SiMe_2O)_{100}\{(NH_2CH_2CH_2CH_2)MeSiO\}_1SiMe_3$ (7.69 g, 1.0 mmoles) and polyethylene glycol 2000 monoacrylate (2.70 g, 1.0 mmoles) were weighed into a 10 dram vial. The solution was stirred with a magnetic stirrer and stir bar for one hour. The final manerial was a solid wax.

$Me_3SiO(SiMe_2O)_{100}\{(NH_2CH_2CH_2CH_2)MeSiO\}1SiMe_3$ (7.69 g, 1.0 mmoles) and polyethylene glycol 2000 monoacrylate (1.84 g, 0.68 mmoles) were weighed into a 10 dram vial. The solution was stirred with a magnetic stirrer and stir bar for one hour. The final material was a solid wax.

Example 19

$MD_{100}D"M+PEG\ 2000,\ PEG\ 1000$ $Me_3SiO(SiMe_2O)_{100}\{(NH_2CH_2CH_2NHCH_2CH(CH_3)CH_2)MeSiO\}_1SiMe_3$ (7.75 g, 1.0 mmoles) and polyethylene glycol 2000 monoacrylate (2.70 g, 1.0 mmoles) were weighed into a 10 dram vial. The solution was stirred with a magnetic stirrer and stir bar for one hour. The final material was a solid.

$Me_3SiO(SiMe_2O)_{100}\{(NH_2CH_2CH_2NHCH_2CH(CH_3)CH_2)MeSiO\}_1SiMe_3$ (7.75 g, 1.0 mmoles) and polyethylene glycol 1000 monoacrylate (1.84 g, 1.0 mmoles) were weighed into a 10 dram vial. The solution was stirred with a magnetic stirrer and stir bar for one hour. The final material was a solid wax.

Example 20

$MD_{100}D"M+PEG\ 2000\ and\ PEG\ 1000$ $Me_3SiO(SiMe_2O)_{100}\{(NH_2CH_2CH_2NHCH_2CH(CH_3)CH_2)MeSiO\}_1SiMe_3$ (2.50 g, 2.00 mmoles) and polyethylene glycol 2000 monoacrylate (5.40 g, 2.00 mmoles) were weighed into a 10 dram vial. The solution was stirred with a magnetic stirrer and stir bar for one hour. The final material was a solid wax.

$Me_3SiO(SiMe_2O)_{10}\{(NH_2CH_2CH_2NHCH_2CH(CH_3)CH_2)MeSiO\}_2SiMe_3$ (3.50 g, 2.80 mmoles) and polyethylene glycol 1000 monoacrylate (5.15 g, 2.80 mmoles) were weighed into a 10 dram vial. The solution was stirred with a magnetic stirrer and stir bar for one hour. The final material was a solid wax.

Example 21

$M"D_{10}M"+PEG\ 2000$ $(NH_2CH_2CH_2NHCH_2CH(CH_3)CH_2)Me_2SiO(SiMe_2O)_{10}$ $SiMe_2(CH_2CH_2CH_2NHCH_2CH_2NH_2)$ (2.5 g, 2.40 mmoles) and polyethylene glycol 2000 monoacrylate (6.19 g, 2.30 mmoles) were weighed into a 10 dram vial. The solution was stirred with a magnetic stirrer and stir bar for one hour. The final material was a solid wax.

$(NH_2CH_2CH_2NHCH_2CH(CH_3)CH_2)Me_2SiO(SiMe_2O)_{10}$ $SiMe_2(CH_2CH_2CH_2NHCH_2CH_2NH_2)$ (3.0 g, 2.88 mmoles) and polyethylene glycol 2000 monoacrylate (5.06 g, 1.88 mmoles) were weighed into a 10 dram vial. The solution was stirred with a magnetic stirrer and stir bar for one hour. The final material was a solid wax.

Example 22

$MD_3D"1M+TFPMA$ $Me_3Si\ (SiMe_2O)_3\ \{NH_2CH_2CH_2NHCH_3CH(CH_3)CH_2\}$ $MeSiO\}_1SiMe_3$(10.16 g., 10.0 mmoles) and 2,2,3,3, tetrafluoropropyl acrylate (1.86 g., 10.0 mmoles) were weighted inno a 10 dram vial. The solution was stirred with a magnetic stirrer and stir bar for one hour. The final material was a water clear low viscosity fluid.

Example 23

$MD_{10}D"_2M+TFPMA$ $Me_3Si(SiMe_2O)_{10}\{NH_2CH_2CH_2NHCH_3CH(CH_3)CH_2)$ $MeSiO\}_2SiMe_3$ (12.51 g., 10.0 mmoles) and 2,2,3,3, tetrafluoropropyl acrylate (3.72 g., 20.0 mmoles) were weighted into a 10 dram vial. The solution was stirred with a magnetic stirrer and stir bar for one hour. The final material was a water clear low viscosity fluid.

Example 24

$M"D_{10}M"+TFPMA$ $(NH_2CH_2CH_2NHCH_2CH(CH_3)CH_2)Me_2SiO(SiMe_2$ $(CH_2CH_2CH_2NHCH_2CH_2CH_2)$ (10.41 g., 10.0 mmoles) and 2,2,3,3, tetrafluoropropyl acrylate (3.72 g., 20.0 mmoles) were weighted into a 10 dram vial. The solution was stirred with a magnetic stirrer and stir bar for one hour. The final material was a water clear low viscosity fluid.

Example 25

$MD_{96}O"_2M\ +TMPTA$ $Me_3Si\ (SiMe_2O)_{96}\{NH_2CH_2CH_2NHCH_3CH(CH_3)CH_2)$ $MeSiO\}_2SiMe_3$(10.0 g.) and Trimethanolpropanetriacrylate (Sartomer 351) (1.0 g. ) were weighted into a 10 dram vial. The solution was stirred for two minutes (until homogeneous) and poured into an aluminum weighing dish to a thickness of 132 mils (0.132 inches). The time for the material to form a cured skin on the sample (SOT or Skin Over Time) was recorded and well as the time for the complete gelation (through cure) and found to be 105 minutes and 180 minutes respectively. A Shore hardness measurement of the resulting gel was taken on a Shore "OO" durometer and was found to be 45.

Example 26

$MD_{96}D"_2M+HDDA$ $Me_3Si(SiMe_2O)_{96}\{NH_2CH_2CH_2NHCH_3CH(CH_3)CH_2)$ $MeSiO\}_2SiMe_3$ (10.0 g.) and Hexanedioldiacrylate (Sartomer 238) (1.0 g.) were weighted into a 10 dram vial. The solution was stirred for two minutes (until homogeneous) and poured into an aluminum weighing dish to a thickness of 120 mils (0.120 inches). The time for the material to form a cured skin on the sample (SOT or Skin Over Time) was recorded and well as the time for the complete gelation (through cure) and found to be 24 to 48 hours and 48 hours respectively. A Shore hardness measurement of the resulting gel was taken on a Shore "OO" durometer and was found to be 3.

Example 27

$MD_{96}D"_2M+PETA$ $Me_3Si(SiMe_2O)_{96}\{NH_2CH_2CH_2NHCH_3CH(CH_3)CH_2)$ $MeSiO\}_2SiMe_3$ (10.0 g.) and Dipenaerythritol Pennaacrylate (Sartomer 399) (1.0 g.) were weighted into a 10 dram vial. The solution was stirred for two minutes (until homogeneous) and poured into an aluminum weighing dish to a thickness of 120 mils (0.120 inches). The time for the material to form a cured skin on the sample (SOT or Skin Over Time) was recorded and well as the time for the complete gelation (through cure) and found to be 75 minutes and 105 minutes respectively. A Shore hardness measurement of the resulting gel was taken on a Shore "OO" durometer and was found to be 35.

Example 28

$MD_{96}D"_2M+$Urethane Acrylate $Me_3Si(SiMe_2O)_{96}\{NH_2CH_2CH_2NHCH_3CH(CH_3)CH_2)$ $MeSiO\}_2SiMe_3$ (10.0 g.) and Hexafunctional aromanic urenhane acrylate containing an acryiated polyol diluent (UCB Radcure Ebecryl® resin 220) (1.0 g.) were weighted into a 10 dram vial. The solution was stirred for two minutes (until homogeneous) and poured into an aluminum weighing dish to a thickness of 122 mils (0.122 inches). The time for the material to form a cured skin on the sample (SOT or Skin Over Time) was recorded and well as the time for the complete gelation (through cure) and found to be less than 30 minutes and 60 minutes respectively. A Shore hardness measurement of the resulting gel was taken on a Shore "OO" durometer and was found to 40.

Example 29

$MD_{96}"_2M+TMPTA+$DIATOMACIOUS EARTH $Me_3SiO(SiMe_2O)_{96}\{NH_2CH_2CH_2NHCH_3CH(CH_3)$ $CH_2)MeSiO\}_2SiMe_3$ (10.0 g.) and Trimethanolpropanetriacrylate (Sartomer 351) (1.0 g. ) along with 3.5 grams of Celite FP-3 filler were weighted into a 10 dram vial. The solution was stirred for two minutes (until homogeneous) and poured into an aluminum weighing dish to a thickness of 170 mils (0.170 inches). The time for the material to form a cured skin on the sample (SOT or Skin Over Time) was recorded and well as the time for the complete gelation (through cure) and found to be 100 minutes and 140 minutes respectively. A Shore hardness measurement of the resulting gel was taken on a Shore "OO" durometer and was found to be 83.

Example 30

MD$_{92}$D"$_2$M+HDDA

Me$_3$SiO(SiMe$_2$O)$_{96}${NH$_2$CH$_2$CH$_2$NHCH$_3$CH(CH$_3$)CH$_2$)MeSiO}$_2$SiMe$_3$ (10.0 g.) and Hexanedioldiacrylate (Sartomer 238)(2.0 g.) were weighted into a 10 dram vial. The solution was stirred for two minutes (until homogeneous) and poured into an aluminum weighing dish to a thickness of 150 mils (0.150 inches). The time for the material to form a cured skin on the sample (SOT or Skin Over Time) was recorded and well as the time for the complete gelation (through cure) and found to be 48 hours and 48 to 72 hours respectively. A Shore hardness measurement of the resulting gel was taken on a Shore "OO" durometer and was found to be less than 1 and a sticky gel.

What is claimed:

1. A composition comprising:
the reaction product of A and B wherein:
A) is at least one polysiloxane selected from the group consisting of
(i) R$_3$SiO(SiR$_2$O)$_x$SiR$_3$ and (ii)

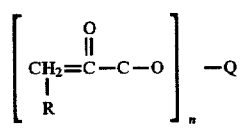

where:
x has an average value of from 0 to 1000.
z has a value of at least 3.
R is independently selected from the group consisting of a hydroxyl group, alkoxy group, tri-fluoropropyl group, an alkyl chain of 1 to 4 carbon atoms, a phenyl group, and an amine functional group, with the proviso that at least one R on the polysiloxane is an amine functional group;
B) is at least one acrylate having the formula $$\left[ \begin{array}{c} O \\ \parallel \\ CH_2 = C - C - O \\ | \\ R \end{array} \right]_n -Q$$

where R is H or CH$_3$, n ≧ 1, and Q is an organic group, selected independently from the group consisting of polyethers, aliphatic, aromatic, and alicyclic groups.

2. The composition of claim 1, wherein Q is a polyether selected from the group consisting of:
(i) —(CH$_2$)$_y$(OCH$_2$CH$_2$)$_a$(OCH$_2$CHCH$_3$)$_{bc}$OR',
(ii) —(CH$_2$)$_y$(OCH$_2$CH$_2$)$_a$OR',
(iii) —(CH$_2$)$_y$(OCH$_2$CH$_2$)$_a$(OCH$_2$CHCH$_3$)$_b$OR',
(iv) —(CH$_2$)$_{yc}$OR',
(v) —(CH$_2$)$_y$(OCH$_2$CHCH$_3$)$_{bc}$OR',
(vi) —(CH$_2$)$_y$(OCH$_2$CH$_2$)$_{ac}$OR', and
(vii) —(CH$_2$)$_y$(OCH$_2$CHCH$_3$)$_b$OR',
where R' is hydrogen, an alkyl radical having from 1 to 4 carbon atoms, an aryl radical having 6 to 12 carbon atoms, an aralkyl radical having at least 6 carbon atoms; or an acyl radical and the integer y is 2–20; a is 1–120; b is 1–50; and c is 1–50.

3. The composition of claim 1, wherein Q is an alkyl group having from 1 to 100 carbon atoms.

4. The composition of claim 1, wherein Q is an aromatic group having from 1 to 100 carbon atoms.

5. The composition of claim 1, wherein Q is an aralkyl radical.

6. The composition of claim 1 wherein the composition additionally contains a solvent, and the solvent is selected from the group consisting of water, alcohols, and aliphatic or aromatic hydrocarbons.

7. The composition of claim 1, wherein x is in the range of 0 to 500.

8. The composition of claim 2, wherein a is in the range of 1 to 50 and b is in the range of 1 to 30.

9. The composition of claim 1, wherein the amine functional group is selected from the group consisting of
(i) —CH$_2$CH$_2$CH$_2$NH$_2$,
(ii) —CH$_2$CH$_2$CH$_2$N(H)CH$_2$CH$_2$NH$_2$,
(iii) —CH$_2$CH$_2$CH$_2$N(H)CH$_2$CH$_2$N(H)CH$_2$CH$_2$NH$_2$, (iv) —CH$_2$CH$_2$CH$_2$CH$_2$NH$_2$, (v) —CH$_2$CH$_2$CH$_2$CH$_2$CH$_2$NH$_2$, (vi) —CH$_2$CH$_2$CH$_2$N(H)Me,
(vii) —CH$_2$CH$_2$CH$_2$N(H)CH$_2$CH$_2$NMe$_2$, (viii) —CH$_2$CH$_2$CH$_2$N(Et)H,
(ix) —CH$_2$CH(CH$_3$)CH$_2$N(H)CH$_2$CH$_2$NH$_2$ and (x) —CH$_2$CH(CH$_3$)CH$_2$NH$_2$, where Me represents a methyl group and Et represents an ethyl group.

10. The composition of claim 1, wherein n has a value of 1.

11. The composition of claim 1, wherein n is in the range of 2 to 5.

12. The composition of claim 10, wherein Q is a polyether selected from the group consisting of:
(i) —(CH$_2$)$_y$(OCH$_2$CH$_2$)$_a$(OCH$_2$CHCH$_2$)$_{bc}$OR',
(ii) —(CH$_2$)$_y$(OCH$_2$CH$_2$)$_a$OR',
(iii) —(CH$_2$)$_y$(OCH$_2$CH$_2$)$_a$(OCH$_2$CHCH$_3$)$_b$OR',
(iv) —(CH$_2$)$_{yc}$OR',
(v) —(CH$_2$)$_y$(OCH$_2$CHCH$_3$)$_{bc}$OR',
(vi) —(CH$_2$)$_y$(OCH$_2$CH$_2$)$_{ac}$OR', and
(vii) —(CH$_2$)$_y$(OCH$_2$CHCH$_3$)$_b$OR',
where R' is hydrogen, an alkyl radical having from 1 to 4 carbon atoms, an aryl radical having 6 to 12 carbon atoms, an aralkyl radical having at least 6 carbon atoms; or an acyl radical and the integer y is 2–20; a is 1–120; b is 1–50; and c is 1–50.

13. The composition of claim 10, wherein Q is an alkyl group having from 1 to 100 carbon atoms.

14. The composition of claim 10, wherein Q is an aromatic group having from 1 to 100 carbon atoms.

15. The composition of claim 10, wherein Q is an aralkyl radical.

16. The composition of claim 10, wherein the composition additionally contains a solvent, and the solvent is selected from the group consisting of water, alcohols, and aliphatic or aromatic hydrocarbons.

17. The composition of claim 10, wherein the composition is a blend of different Q groups.

18. The composition of claim 10, wherein x is in the range from 0 to 500.

19. The composition of claim 11 wherein the composition contains a filler.

* * * * *